(12) United States Patent
Meyer

(10) Patent No.: US 8,279,559 B1
(45) Date of Patent: Oct. 2, 2012

(54) PROCESS FOR CREATING DISCRETE TRACK MAGNETIC RECORDING MEDIA INCLUDING AN APPARATUS HAVING A STYLUS SELECTIVELY APPLYING STRESS TO A SURFACE OF THE RECORDING MEDIA

(76) Inventor: Dallas W. Meyer, Prior Lake, MN (US)

( * ) Notice: Subject to any disclaimer, the term of this patent is extended or adjusted under 35 U.S.C. 154(b) by 391 days.

(21) Appl. No.: 12/651,961

(22) Filed: Jan. 4, 2010

Related U.S. Application Data

(60) Provisional application No. 61/142,300, filed on Jan. 2, 2009.

(51) Int. Cl.
*G11B 5/60* (2006.01)
(52) U.S. Cl. .................. 360/237.1; 360/77.07; 360/135
(58) Field of Classification Search .... 360/77.05–77.08, 360/237.1, 131, 135
See application file for complete search history.

(56) References Cited

U.S. PATENT DOCUMENTS

| | | | |
|---|---|---|---|
| 3,258,750 A | 6/1966 | Shew |
| 3,593,331 A | 7/1971 | Connell et al. |
| 3,753,252 A | 8/1973 | Tietz |
| 4,599,667 A | 7/1986 | van Blerk |
| 4,783,705 A | 11/1988 | Moon et al. |
| 4,802,050 A | 1/1989 | Miyabayashi et al. |
| 5,060,210 A | 10/1991 | Fennema et al. |
| 5,193,034 A | 3/1993 | Tsuyoshi et al. |
| 5,210,672 A | 5/1993 | Ivers et al. |
| 5,278,703 A | 1/1994 | Rub et al. |
| 5,350,618 A | 9/1994 | Togawa et al. |
| 5,454,158 A | 10/1995 | Fontana et al. |
| 5,521,778 A | 5/1996 | Boutaghou et al. |
| 5,689,057 A | 11/1997 | Baumgart et al. |
| 5,834,864 A | 11/1998 | Hesterman et al. |
| 5,841,608 A | 11/1998 | Kasamatsu et al. |
| 5,858,474 A | 1/1999 | Meyer et al. |
| 5,956,217 A | 9/1999 | Xuan et al. |
| 6,075,673 A | 6/2000 | Wilde et al. |
| 6,078,468 A | 6/2000 | Fiske |
| 6,091,537 A | 7/2000 | Sun et al. |
| 6,101,058 A | 8/2000 | Morris |

(Continued)

FOREIGN PATENT DOCUMENTS

EP 1672654 6/2006

OTHER PUBLICATIONS

Lee et al. "Bistable planar polysilicon microactuators with shallow arch-shaped leaf springs." Proc. SPIE, 3876, 274 (1999).

(Continued)

*Primary Examiner* — Allen Heinz
(74) *Attorney, Agent, or Firm* — Maschoff Gilmore & Israelsen

(57) ABSTRACT

One embodiment includes a track recording head for creating discrete tracks in a rotating magnetic storage medium. The track recording head includes a main body, at least one stylus, and a stylus actuator. The main body is configured to be attached to a head gimbal assembly. The main body has an air bearing surface configured to face a corresponding surface of the rotating magnetic storage medium. The stylus is formed on the air bearing surface and is configured to be actuated towards the surface of the rotating magnetic storage medium to contact and apply stress to the rotating magnetic storage medium to create isolation regions of non-directionally magnetizable material. The stylus actuator is formed in the main body and is configured to actuate the stylus.

26 Claims, 11 Drawing Sheets

U.S. PATENT DOCUMENTS

| | | | |
|---|---|---|---|
| 6,153,281 A | 11/2000 | Meyer et al. | |
| 6,154,335 A | 11/2000 | Smith et al. | |
| 6,164,118 A | 12/2000 | Suzuki et al. | |
| 6,166,879 A | 12/2000 | Jordan | |
| 6,239,936 B1 | 5/2001 | Abraham et al. | |
| 6,262,868 B1 | 7/2001 | Arya et al. | |
| 6,314,814 B1 | 11/2001 | Brannon et al. | |
| 6,368,425 B1 | 4/2002 | Segar et al. | |
| 6,384,510 B1 | 5/2002 | Grade et al. | |
| 6,404,599 B1 | 6/2002 | Vigna | |
| 6,414,827 B1 | 7/2002 | Young et al. | |
| 6,417,981 B1 | 7/2002 | Smith | |
| 6,421,211 B1 | 7/2002 | Hawwa et al. | |
| 6,440,520 B1 * | 8/2002 | Baglin et al. | 428/847.7 |
| 6,452,735 B1 | 9/2002 | Egan et al. | |
| 6,452,755 B2 | 9/2002 | Bonin | |
| 6,465,929 B1 | 10/2002 | Levitan et al. | |
| 6,469,859 B1 | 10/2002 | Chainer et al. | |
| 6,487,045 B1 | 11/2002 | Yanagisawa | |
| 6,490,118 B1 | 12/2002 | Ell et al. | |
| 6,493,177 B1 | 12/2002 | Ell et al. | |
| 6,501,623 B1 | 12/2002 | Sassolini et al. | |
| 6,519,107 B1 | 2/2003 | Ehrlich et al. | |
| 6,522,494 B1 | 2/2003 | Magee | |
| 6,535,360 B1 | 3/2003 | Kim et al. | |
| 6,542,281 B2 | 4/2003 | Feldman et al. | |
| 6,545,970 B2 | 4/2003 | Durnin et al. | |
| 6,547,975 B1 | 4/2003 | Kobrin | |
| 6,556,380 B2 | 4/2003 | Bunch et al. | |
| 6,563,665 B1 | 5/2003 | Ell | |
| 6,587,312 B2 | 7/2003 | Murari et al. | |
| 6,594,119 B1 | 7/2003 | Koshikawa et al. | |
| 6,600,619 B1 | 7/2003 | Morris et al. | |
| 6,600,634 B1 | 7/2003 | Kim et al. | |
| 6,611,399 B1 | 8/2003 | Mei et al. | |
| 6,633,451 B1 | 10/2003 | Chainer et al. | |
| 6,662,623 B2 | 12/2003 | Baumgartner et al. | |
| 6,683,757 B1 | 1/2004 | Bonin et al. | |
| 6,697,232 B1 | 2/2004 | Hipwell et al. | |
| 6,724,558 B2 | 4/2004 | Bryant et al. | |
| 6,747,836 B2 | 6/2004 | Stevens et al. | |
| 6,762,899 B2 | 7/2004 | Ottesen et al. | |
| 6,768,610 B1 | 7/2004 | Morris et al. | |
| 6,785,086 B1 | 8/2004 | Bonin et al. | |
| 6,859,346 B1 | 2/2005 | Meyer | |
| 6,870,709 B2 | 3/2005 | Shimanouchi et al. | |
| 6,914,746 B1 | 7/2005 | Meyer | |
| 7,092,194 B2 | 8/2006 | Meyer | |
| 7,095,591 B2 | 8/2006 | Imamura et al. | |
| 7,180,650 B2 | 2/2007 | Epitaux | |
| 7,218,471 B2 | 5/2007 | Meyer | |
| 7,248,442 B1 | 7/2007 | Meyer | |
| 7,369,369 B1 | 5/2008 | Meyer | |
| 7,538,983 B1 | 5/2009 | Meyer | |
| 7,849,585 B1 | 12/2010 | Meyer | |
| 2001/0009776 A1 | 7/2001 | Ferrari et al. | |
| 2002/0101129 A1 | 8/2002 | Grade et al. | |
| 2003/0093894 A1 | 5/2003 | Dugas et al. | |
| 2003/0161061 A1 | 8/2003 | Lamberts | |
| 2003/0161070 A1 | 8/2003 | Bonin | |
| 2003/0161071 A1 | 8/2003 | Bonin et al. | |
| 2003/0197969 A1 | 10/2003 | Szita et al. | |
| 2004/0085670 A1 | 5/2004 | Li et al. | |
| 2004/0119376 A1 | 6/2004 | Chou et al. | |
| 2004/0160702 A1 | 8/2004 | Hirano et al. | |
| 2005/0052723 A1 | 3/2005 | Watanabe et al. | |
| 2005/0062361 A1 | 3/2005 | Harley et al. | |
| 2005/0179338 A1 | 8/2005 | Tamura | |
| 2005/0237597 A1 | 10/2005 | Epitaux et al. | |
| 2009/0296264 A1 | 12/2009 | Meyer | |
| 2010/0064395 A1 | 3/2010 | Clark | |

OTHER PUBLICATIONS

U.S. Appl. No. 12/963,415, filed Dec. 8, 2010, Dallas W. Meyer.
U.S. Appl. No. 12/115,396, Sep. 29, 2010, Notice of Allowance.
U.S. Appl. No. 12/472,325, Sep. 2, 2010, Notice of Allowance.
U.S. Appl. No. 12/115,396, filed May 5, 2008, Dallas W. Meyer.
Bhushan, Chemical, mechanical and tribological characterization of ultra-thin and hard amorphous carbon coatings as thin as 3.5 nm: recent developments, Diamond and Related Materials, 8, (1999), 1985-2015.
U.S. Appl. No. 10/818,641, Jul. 20, 2007, Final Office Action.
U.S. Appl. No. 10/818,641, Jan. 8, 2008, Notice of Allowance.
U.S. Appl. No. 10/900,713, May 10, 2007, Office Action.
U.S. Appl. No. 10/900,713, Nov. 26, 2007, Final Office Action.
U.S. Appl. No. 10/900,713, Jun. 3, 2008, Office Action.
U.S. Appl. No. 10/900,713, Oct. 30, 2008, Final Office Action.
U.S. Appl. No. 10/900,713, Feb. 9, 2009, Notice of Allowance.
U.S. Appl. No. 12/115,396, Feb. 19, 2010, Office Action.
U.S. Appl. No. 12/472,325, Apr. 26, 2010, Office Action.

* cited by examiner

PROCESS FOR CREATING DISCRETE TRACK MAGNETIC RECORDING MEDIA INCLUDING AN APPARATUS HAVING A STYLUS SELECTIVELY APPLYING STRESS TO A SURFACE OF THE RECORDING MEDIA

CROSS-REFERENCE TO RELATED APPLICATIONS

The present application claims the benefit of and priority to U.S. Provisional Application Ser. No. 61/142,300, entitled "DISCRETE TRACK RECORDING MEDIA," filed Jan. 2, 2009, which application is fully incorporated herein by reference in its entirety.

BACKGROUND

1. Field of the Invention

The present invention generally relates to magnetic storage devices. More particularly, some embodiments relate to creating discrete media tracks in magnetic storage devices via permanent magnetic stress erasure.

2. Related Technology

During recent years, there has been a steady improvement in the volume of data that can be stored on magnetic storage media, such as hard disk drives used in computers. Today, a single 3.5 inch magnetic storage disk can store 250 gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid-state devices, drive arrays (RAID), single rotating magnetic disk drives, and removable optical media. FIG. 1 is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 1, however, the performance of single rotating magnetic storage devices is increasing less rapidly than the performance of RAID and solid-state devices.

The issue of magnetic isolation of bits on the recording surface of hard disk drives limits the growth in bit and track density. Thermal stability limits the grain size of the media, which in turn limits the bit cell dimensions due to edge geometry and inter-granular coupling. Control of head geometries and stray leakage flux at the track edges further complicates the issues, and limits the signal to noise ratio gains with improved write flux due to side writing. Conventional methods of isolating grains during media deposition and improving thermal stability are reaching physical limits and the need to further isolate tracks and bits is required for further density gains.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments relate to creating discrete media tracks in magnetic storage devices via permanent magnetic stress erasure.

One example embodiment includes a track recording head for creating discrete tracks in a rotating magnetic storage medium. The track recording head includes a main body, at least one stylus, and a stylus actuator. The main body is configured to be attached to a head gimbal assembly. The main body has an air bearing surface configured to face a corresponding surface of the rotating magnetic storage medium. The stylus is formed on the air bearing surface and is configured to be actuated towards the surface of the rotating magnetic storage medium to contact and apply stress to the rotating magnetic storage medium to create isolation regions of non-directionally magnetizable material. The stylus actuator is formed in the main body and is configured to actuate the stylus.

Another example embodiment includes a method of creating discrete and magnetically uncoupled tracks in a rotating magnetic storage medium. The method includes rotating a rotating magnetic storage medium beneath a track recording head. At least one stylus formed on an air bearing surface of the track recording head is actuated to apply stress to a surface of the rotating magnetic storage medium. The applied stress is sufficient to create an isolation region of non-directionally magnetizable material between adjacent tracks in the rotating magnetic storage medium. The track recording head is translated across the surface of the rotating magnetic storage medium with the stylus actuated during at least part of the translation to form a track pattern including one or more isolation regions on the rotating magnetic storage medium. A servo pattern written on the rotating magnetic storage medium is monitored to control positioning of the at least one stylus and to thereby control the track pattern that is formed.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Example Operating Environment

Figure 1:
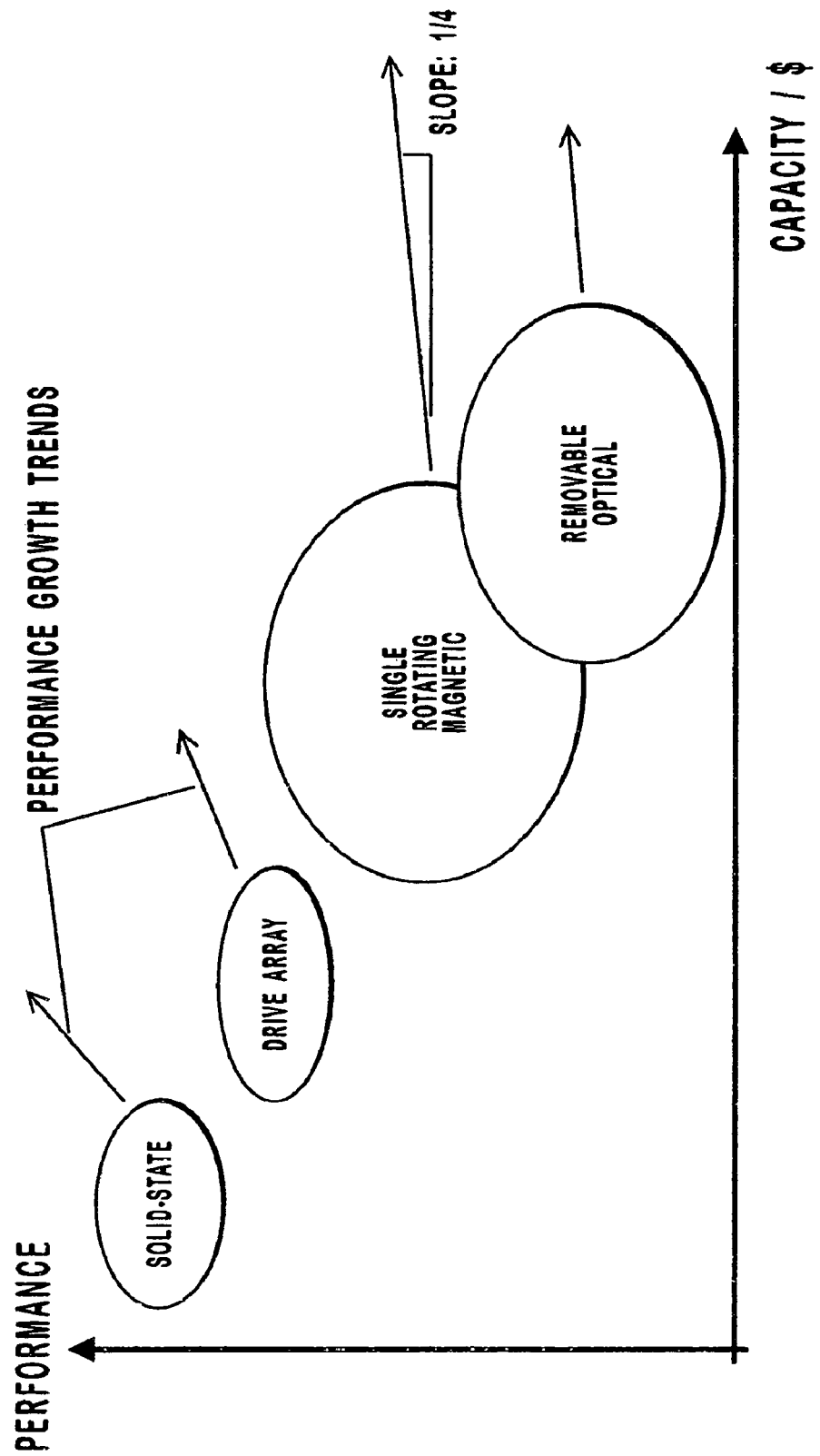
FIG. 1 is a graph that depicts relative cost and performance values of conventional data storage device technologies.
Figure 2A:
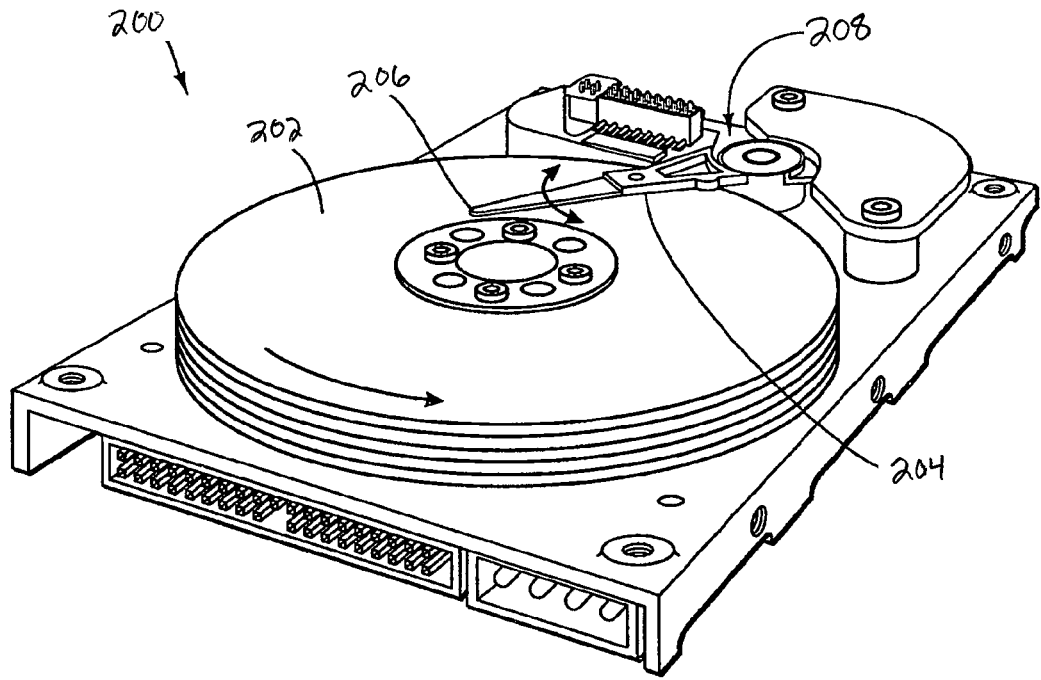
FIG. 2A is a perspective view of a magnetic storage device in which some embodiments of a track recording head can be implemented.

With reference to FIG. 2A, a first example operating environment is illustrated in which some embodiments can be practiced. The example operating environment of FIG. 2A is a magnetic storage device 200. The magnetic storage device 200 includes a rotating magnetic storage medium 202 that is generally configured to store digitally encoded data using directionally magnetized ferromagnetic material on the surface of the rotating magnetic storage medium 202.

The magnetic storage device 200 includes a head gimbal assembly ("HGA") 204 with a recording head 206, also known as a "slider". The recording head 206 includes a read/write transducer (not shown). The HGA 204 positions the read/write transducer of recording head 206 in close proximity to the surface of the rotating magnetic storage medium 202 to enable data to be read from and written to the rotating magnetic storage medium 202. An actuator assembly 208 rotates the HGA 204 during operation to position the read/write transducer of the recording head 206 at the proper location over the rotating magnetic storage medium 202 for reading data from and writing data to the rotating magnetic storage medium 202.

In some embodiments, the actuator assembly 208 includes a voice coil that uses a feedback loop based on servo tracks that are embedded between the data tracks on the rotating magnetic storage medium 202. The servo tracks serve to keep the recording head 206 properly centered on a data track that is being read from or written to. Track pitch, e.g., the spacing between adjacent tracks, of the rotating magnetic storage medium 202 is minimized in some embodiments by creating isolation regions between adjacent tracks for improved data storage density on the rotating magnetic storage medium 202. According to this and other examples, the isolation regions are created using media stress erasure, as will be explained in greater detail below.

Figure 2B:
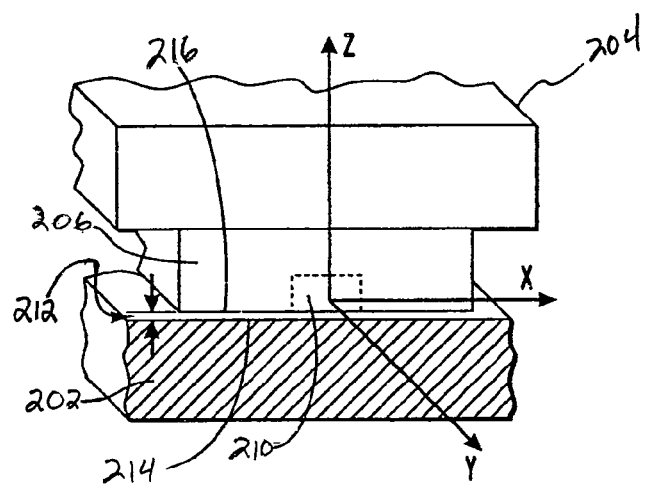
FIG. 2B is a close up perspective view of a portion of the magnetic storage device of FIG. 2A

Turning next to FIG. 2B, a closeup of the end of the HGA 204 and recording head 206 is illustrated. As shown in FIG. 2B, the recording head 206 includes a read/write transducer 210 separated from the rotating magnetic storage medium 202 by a predetermined distance referred to as the fly height 212.

FIGS. 2A-2B set forth a convention regarding a frame of reference that is useful in describing some of the embodiments herein. As shown in FIG. 2A, the rotating magnetic storage medium 202 rotates counterclockwise, such that elements on the rotating magnetic storage medium 202 that encode individual bits of data travel under the recording head 206 in a direction that is substantially parallel to the longitudinal axis of the arm of the HGA 204. In other words, a particular track of the rotating magnetic storage medium 202, which is substantially concentric with the circumference of the rotating magnetic storage medium 202, is substantially tangent to the longitudinal axis of the HGA 204 when the track is positioned under recording head 206. The motion of the rotating magnetic storage medium 202 with respect to HGA 204 defines a trailing edge or surface of the recording head 206 that is distal from the axis of rotation of the HGA 204.

FIG. 2B is a perspective view of the distal end of the HGA 204 and recording head 206, and shows an elevation of the trailing surfaces of the HGA 204 and recording head 206. In FIG. 2B, the motion of the illustrated portion of the rotating magnetic storage medium 202 during operation is substantially in the y direction, while the orientation of the data tracks of this portion of the rotating magnetic storage medium 202 is likewise substantially in the y direction. As shown in FIG. 2B, the z direction is defined to be substantially perpendicular to a surface 214 of the rotating magnetic storage medium 202. The x direction is defined to be substantially perpendicular to or lateral with respect to the orientation of the tracks. In other words, motion of the recording head 206 in the x direction can cause the read/write transducer 210 to be laterally moved between tracks or to be centered over a track; thus, movement of the recording head 206 in the x direction is known as track-to-track movement.

FIG. 2B also illustrates the fly height 212, which is defined to be the distance in the z direction between the surface 214 of the rotating magnetic storage medium 202 and an adjacent air bearing surface 216 of the recording head 206. The air bearing surface 216 of recording head 206 is so named due to the presence of an air bearing between the recording head 206 and the rotating magnetic storage medium 202 during operation. An air bearing is a cushion or layer of air that develops between the surface 214 of the rotating magnetic storage medium 202 and the air bearing surface 216 of the recording head 206 as the rotating magnetic storage medium 202 drags the air molecules underneath the air bearing and read/write transducer 210.

The definitions and descriptions of track-to-track, fly height, and related concepts as described above are applied in the following discussion in describing various features according to some embodiments. Note that the principles of the present invention can be reliably used with existing magnetic storage devices as well as with magnetic storage devices developed in the future. Thus, the description contained herein is merely illustrative of the broader concepts encompassed by the present invention and is not meant to limit the present invention in any way.

According to some embodiments, the recording head 206 includes one or more styli for creating isolation regions between adjacent tracks on the rotating magnetic storage medium 202. Alternately or additionally, the one or more styli can be used to create isolation regions within each track to form isolated bit cells. In some embodiments, the HGA 204 is attached to a piezo-based actuator assembly 208 providing control of the one or more styli to within 10 nanometers or less for precise and independent control of track placement, including elimination of spindle written in run-out, pivot to disc center rotation offset, and the like.

Alternately or additionally, the one or more styli are included in a separate track recording head (not shown) attached to the recording head 206 and/or HGA 204 via one or more micro actuator assemblies for precise and independent control of track placement. Optionally the micro actuator assembly includes an interleaver assembly and a plurality of flexure beam assemblies or a plurality of piezoelectric structures such as described in U.S. Pat. No. 7,538,983, entitled "MICROPOSITIONER RECORDING HEAD FOR A MAGNETIC STORAGE DEVICE," which patent is hereby incorporated by reference in its entirety.

II. Example Track Recording Heads

Figure 3:
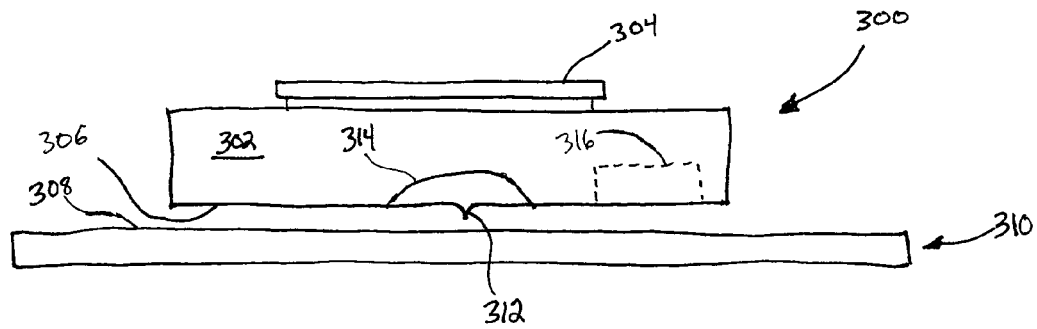
FIG. 3 illustrates a first embodiment of a track recording head having a single stylus that can be employed in the magnetic storage device of FIG. 2A.
Figure 3:
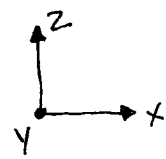

Turning next to FIG. 3, a first example track recording head 300 is disclosed. The track recording head 300 may correspond to the recording head 206 of FIGS. 2A-2B or may represent a distinct track recording head 300 that is separate from and attached to the recording head 206.

As shown in FIG. 3, the track recording head 300 includes a main body 302 attached to an HGA 304. The main body 302 includes an air bearing surface 306 that faces a corresponding surface 308 of a rotating magnetic storage medium 310.

A stylus or ridge 312 is formed on the air bearing surface 306 of the main body 302. The stylus 312 is configured to be actuated in the vertical direction (e.g., the z-direction) towards the surface 308 of rotating magnetic storage medium 310. Generally, the stylus 312 contacts the surface 308 of rotating magnetic storage medium 310 to create non-magnetic isolation regions on the surface 308. The isolation regions include concentric circles or spirals in some embodiments that isolate adjacent tracks from one another. Alternately or additionally, the isolation regions include lateral lines that isolate adjacent bits within each track from one another.

In this and other examples, the stylus 312 extends beyond the air bearing surface 306 in the z direction between 10-500 angstroms. The distance the stylus 312 extends beyond the air bearing surface 306 can be varied by actuating the stylus 312 as explained below.

The track recording head 300 further includes a stylus actuator 314 formed in the main body 302. The stylus actuator 314 is configured to actuate the stylus 312 in the vertical direction towards and away from the surface 308 of rotating magnetic storage medium 310. In some embodiments, the stylus actuator 314 is a heater element.

Optionally, the track recording head 300 further includes a read/write transducer 316 for reading data from and writing data to the rotating magnetic storage medium 310. In this and other examples, a transducer actuator such as a heater element can be included in the track recording head 300 for spacing control and/or more precise measurements by the read/write transducer. In some embodiments that include both a transducer actuator and stylus actuator 314, the transducer actuator and stylus actuator 314 share a ground but include separate control leads.

Figure 4A:
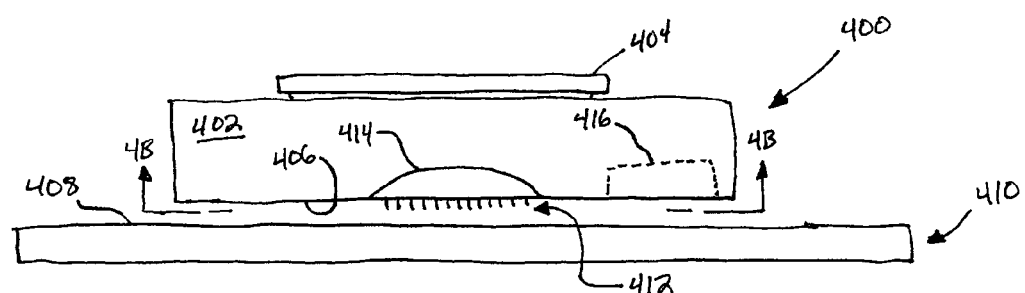
FIGS. 4A-4B illustrate a second embodiment of a track recording head having multiple styli that can be employed in the magnetic storage device of FIG. 2A.
Figure 4A:
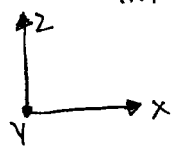
Figure 4B:
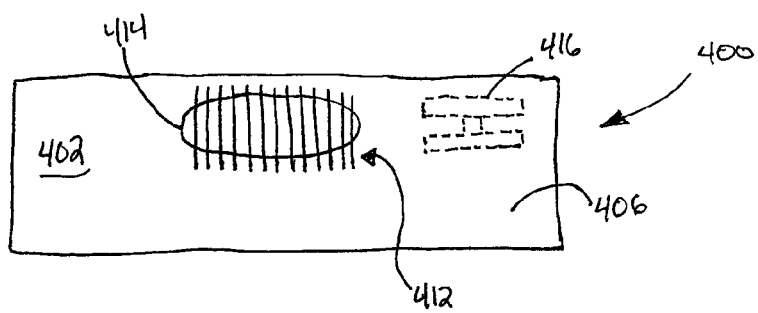
Figure 4B:
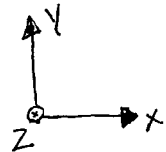

Turning next to FIGS. 4A-4B, a second example track recording head 400 is disclosed. The track recording head 400 may correspond to the recording head 206 of FIGS. 2A-2B or may represent a distinct track recording head 400 that is separate from and attached to the recording head 206.

As shown in FIGS. 4A-4B, the track recording head 400 includes a main body 402 attached to an HGA 404. The main body 402 includes an air bearing surface 406 that faces a corresponding surface 408 of a rotating magnetic storage medium 410.

A plurality of styli or ridges 412 is formed on the air bearing surface 406 of the main body 402. The styli 412 are configured to extend in the vertical direction towards the surface 408 of rotating magnetic storage medium 410. Generally, the styli 412 contact the surface 408 of rotating magnetic storage medium 410 to create non-magnetic isolation regions on the surface 408. The isolation regions include concentric circles or spirals in some embodiments that isolate adjacent tracks from one another. Alternately or additionally, the isolation regions include lateral lines that isolate adjacent bits within each track from one another.

The track recording head 400 further includes a stylus actuator 414 formed in the main body 402. The stylus actuator 414 is configured to actuate the styli 412 in the vertical direction towards and away from the surface 408 of rotating magnetic storage medium 410. In some embodiments, the stylus actuator 414 is a heater element.

Optionally, the track recording head 400 further includes a read/write transducer 416 for reading data from and writing data to the rotating magnetic storage medium 410.

Figure 5:
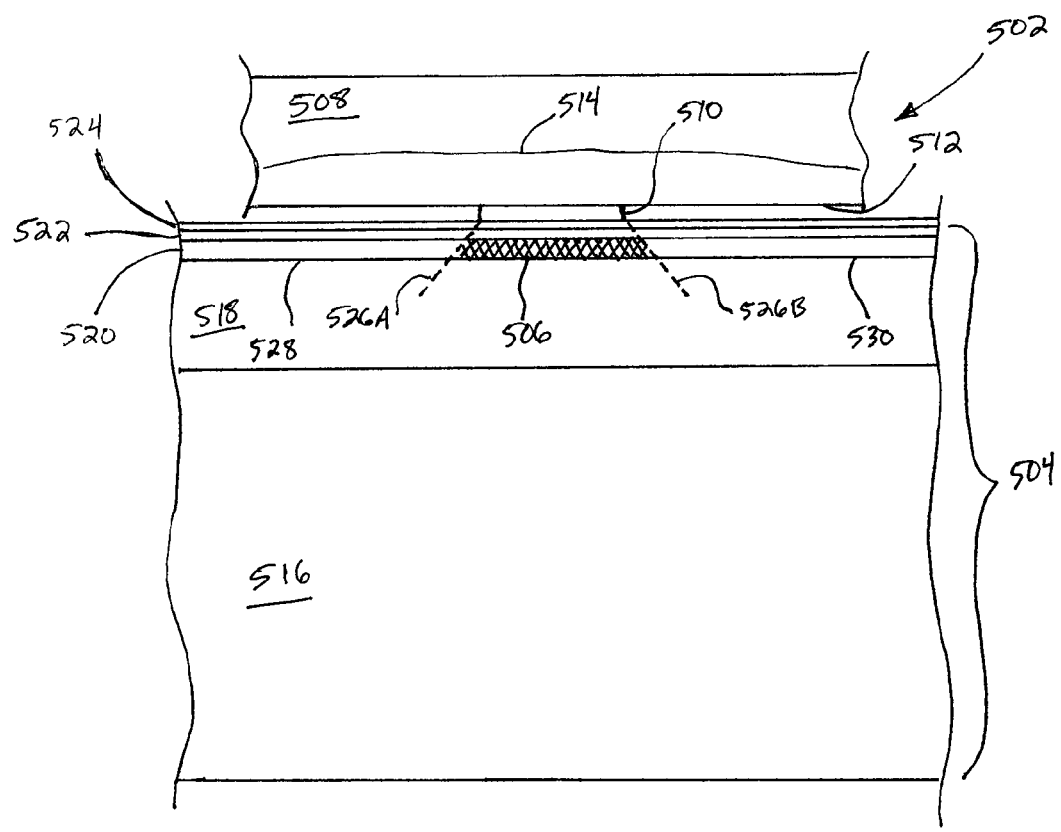
FIG. 5 is a cross-sectional view of a track recording head and rotating magnetic storage medium depicting details in the proximity of a stylus of the track recording head.

Turning next to FIG. 5, details regarding a track recording head 502, rotating magnetic storage medium 504, and isolation regions 506 created by the track recording head 502 are disclosed. The track recording head 502 and rotating magnetic storage medium 504 of FIG. 5 may correspond to, respectively, the track recording head 300, 400 and rotating magnetic storage medium 310, 410 of FIGS. 3-4A.

As shown in FIG. 5, the track recording head 502 includes a main body 508, at least one stylus 510 formed on an air bearing surface 512 of the main body 508, and a stylus actuator 514.

FIG. 5 is a close up view of the area around the stylus 510, including a detailed cross-section of the rotating magnetic storage medium 504. In connection with FIG. 5, various dimensions of the track recording head 502, stylus 510 and rotating magnetic storage medium 504 will be discussed. It will be appreciated, however, with the benefit of the present disclosure, that the dimensions discussed herein are provided by way of example only and should not be construed to limit the invention in any way.

As shown in FIG. 5, the rotating magnetic storage medium 504 is made up of a plurality of layers, including a substrate 516, an under layer 518, a magnetic layer 520 and an overcoat 522. The underlayer 518, magnetic layer 520 and overcoat 522 are deposited on one side (or both sides) of the substrate 516 using any suitable process, such as vacuum deposition processes including magnetron sputtering.

The substrate 516 includes aluminum, glass, ceramic, or other suitable material(s). In some embodiments, the substrate 516 is approximately 20 million angstroms (e.g., 2 millimeters or 0.002 meters) thick, as measured in the z direction.

The under layer 518 includes various non-magnetic metallic alloys or other suitable material(s). The underlayer 518 controls crystallographic orientation and grain size of the magnetic layer 520 during deposition of the magnetic layer 520. In some embodiments, the underlayer 518 is approximately 600 angstroms thick, as measured in the z direction.

The magnetic layer 520 includes a cobalt-based alloy or other suitable material(s) having perpendicular magnetization. It is understood, however, that the principles described herein also apply to magnetic layers 520 having in-plane magnetization. In some embodiments, underlayer 518 controls the magnetic layer 520 during deposition such that the atoms of the magnetic layer 520 are oriented into a particular desired crystal lattice during deposition, such as a hexagonal close pack ("HCP") crystal lattice, that is generally configured for directional magnetization. Alternately or additionally, the magnetic layer 520 is approximately 100 angstroms thick, as measured in the z direction.

The overcoat 522 is a protective layer including carbon or other suitable material(s). In some embodiments, the overcoat 522 is approximately 20 angstroms thick as measured in the z direction.

Optionally, a lubricant 524 is applied to the overcoat 522 to reduce friction between the rotating magnetic storage medium 504 and the track recording head 508. The lubricant 524 is left on the rotating magnetic storage medium 504 after track and/or bit isolation is performed by the track recording head 502 in some embodiments to reduce friction between the rotating magnetic storage medium 504 and a regular recording head (not shown).

Alternately, the lubricant 524 is stripped from the rotating magnetic storage medium 504 after track and/or bit isolation and a new lubricant coating (not shown) is applied to the rotating magnetic storage medium 504. The new lubricant coating may be the same as or different than lubricant 524.

As shown in the close up view of FIG. 5, the stylus 510 does not come to a sharp point where the stylus 510 contacts the rotating magnetic storage medium 504. Rather, the stylus 510 is substantially flat where it contacts the rotating magnetic storage medium 504. In some embodiments, the width of the stylus 510 is between 0.01 and 0.1 micro meters ("μm") as measured in the x direction and the length of the stylus 510 is between 0.1 and 5 μm as measured in the y direction. In other embodiments, the width of the stylus 510 is less than 0.01 μm or more than 0.1 μm and/or the length of the stylus 510 is less than 0.1 μm or more than 5 μm.

In the example of FIG. 5 and in the other examples provided herein, styli such as stylus 510 are made from one or more of diamond, carbon, diamond-like-carbon, carbon nano-tubes, silicon carbide, silicon nitride, alumina, titanium carbide, or other suitable material(s). Alternately or additionally, styli such as stylus 510 are patterned using additive or subtractive photolithography methods, focused ion beam shaping, or other suitable method(s).

Generally, the track recording head 502 is configured to create discrete tracks and/or bits on the rotating magnetic storage medium 504 using permanent magnetic stress erasure. Briefly, in operation, this includes exertion of a downward force (e.g., via stylus actuator 514) on the stylus 510, such that the stylus 510 contacts and applies stress to the rotating magnetic storage medium 504 through the lubricant 524, and where the reaction force is supported by the active air bearing. The zone of influence of the applied stress from the stylus 510 on the rotating magnetic storage medium 504 is denoted by the dotted lines 526A, 526B and includes everything in between the dotted lines 526A, 526B, collectively referred to hereinafter as "zone of influence 526".

In the magnetic layer 520, the applied stress from the stylus 510 stresses the magnetic layer 520 within the zone of influence 526 sufficiently to form a substantially non-magnetic isolation region 506. More particularly, the applied stress from the stylus 510 alters the crystal lattice of the magnetic layer 520 within the zone of influence 526 from a crystal lattice—such as HCP crystal lattice—that is suitable for directional magnetization, to a crystal lattice—such as face centered cubic ("FCC") crystal lattice—that is not suitable for directional magnetization from a recording head.

Generally, the amount of stress to transition the portion of magnetic layer 520 within zone of influence 526 to a non-magnetic state is on the order of the threshold of plastic deformation of the crystal lattice structure of the magnetic layer 520 and may depend on, for example, the number of crystal defects, locations of grain boundaries, ratio of applied hydrostatic stress versus shearing stress, and/or temperature.

In some embodiments, the stress applied to transition the magnetic layer 520 within zone of influence 526 to a non-magnetic state is in a range of 100-1000 mega pascals ("MPa"). In other embodiments, the applied stress is below 100 MPa or above 1000 MPa. Assuming the stylus 510 has a surface area of 0.1 μm$^2$, a load of 0.1 grams force or 1 milli-Newton ("mN") over the stylus 510 equates to 10 giga pascals ("GPa") of normal stress at the interface of the stylus 510 with the rotating magnetic storage medium 504, and something slightly less than 10 GPa for the Mohr's stress responsible for driving lattice changes in the magnetic layer 520. As such, stress sufficient to transition the magnetic layer 520 within zone of influence 526 to a non-magnetic state can be generated with a relatively small load (e.g., less than 1 mN) on the stylus 510. Furthermore, it will be appreciated that sufficient load can easily be generated on a track recording head with multiple styli (e.g., track recording head 400) to create multiple isolation regions 506 using multiple styli simultaneously.

As shown in FIG. 5, the isolation region 506 is formed between two adjacent tracks 528, 530. In some embodiments, each of tracks 528, 530 is approximately 1000 angstroms wide as measured in the x direction. In other embodiments, each of tracks 528, 530 is more or less than 1000 angstroms wide.

III. Stylus Formation

Styli such as the styli 312, 412, 510 of FIGS. 3-5 can be formed using any one or more of a variety of techniques. For example, in some embodiments, the styli 312, 412, 510 are formed on main bodies 302, 402, 508 by depositing a hard material such as diamond, carbon, diamond-like-carbon, carbon nano-tubes, silicon carbide, silicon nitride, alumina, titanium carbide, or other suitable material(s) on the main bodies 302, 402, 508 in a location of the main body 302, 402, 508 that is within the influence of the stylus actuators 314, 414, 514.

Optionally, in track recording heads 400 that include multiple styli 412, the styli 412 are spaced apart from each other a predetermined distance that corresponds to a desired distance between tracks or some multiple thereof. Some embodiments that include multiple styli 412 spaced apart from each other by a predetermined distance that is a multiple of the desired track distance can be used to create nested spiral track patterns with a predetermined track pitch on the corresponding rotating magnetic storage medium 310, 410, 504 as described in greater detail below.

Figure 6A:
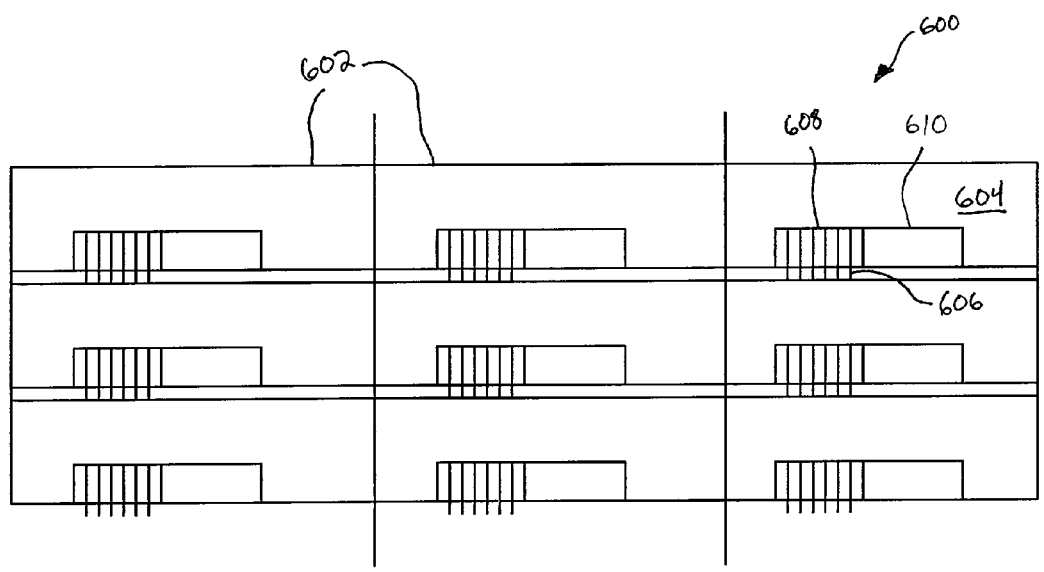
FIG. 6A illustrates a wafer that can be sectioned into a plurality of track recording heads.

Alternately or additionally, track recording heads 300, 400, 502 including styli 312, 412, 510 can be formed in wafers and subsequently sectioned into individual track recording heads. For example, FIG. 6A discloses a portion of a wafer 600 including a plurality of separate track recording head areas 602 formed therein. Each of the track recording head areas 602 includes a main body 604, and one or more styli 606 and a stylus actuator 608 formed therein. Optionally, each of the track recording head areas 602 further includes a read/write transducer 610 or other magnetic read/write element formed therein.

In some embodiments, the styli 606 are formed by creating narrow vertical wall trenches near the stylus actuator 608 in the wafer 600 encapsulation material and then filling in the narrow vertical wall trenches with material for the styli 606 such as diamond, carbon, diamond-like-carbon, carbon nanotubes, silicon carbide, silicon nitride, alumina, titanium carbide or other material suitable for forming isolation regions in a rotating magnetic storage medium.

Alternately or additionally, the styli 606 are formed by depositing suitable material for the styli 606 on or near the stylus actuator 608 using an ion beam etch, an undercutting ashing process, or other method for patterning the deposited material. After formation of the styli 606, they are at least partially encapsulated by wafer 600 encapsulation material such as alumina.

Figure 6B:
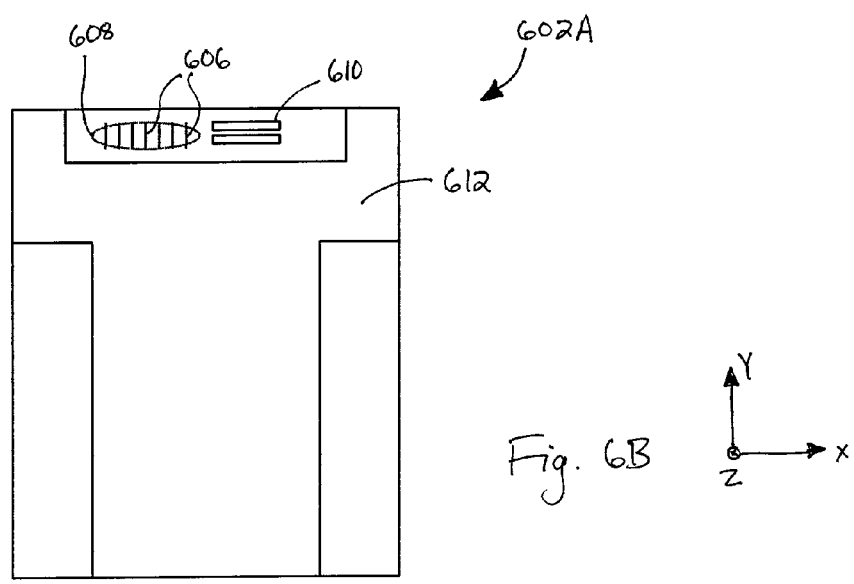
FIG. 6B depicts a track recording head that can be formed from the wafer of FIG. 6A.

After forming the styli 606, the wafer 600 is sectioned or diced into discrete track recording heads such as the track recording head 602A of FIG. 6B. Each of the track recording heads 602A corresponds to a different one of the track recording head areas 602 of FIG. 6A. The styli 606 are formed in the track recording head areas 602 of FIG. 6A so as to be exposed at an air bearing surface 612 of the track recording heads 602A after the wafer 600 is sectioned.

After sectioning the wafer 600, the air bearing surface 612 of each track recording head 602A is lapped to provide a smooth finish on the air bearing surface 612. In some embodiments, the material of the styli 606 laps at a lower rate than the encapsulation material of the wafer 600 such that after lapping of the track recording head 602A is terminated, the styli 606 protrude in the z direction beyond the air bearing surface 612. In this and other examples, the styli 606 protrude in the z direction beyond the air bearing surface 612 in the range of 2-20 nano meters ("nm"). Optionally, the use of encapsulation material around the styli 606 permits the track recording head 602A to be re-lapped to re-create the styli 606 if the styli 606 wear away through use.

Figure 7:
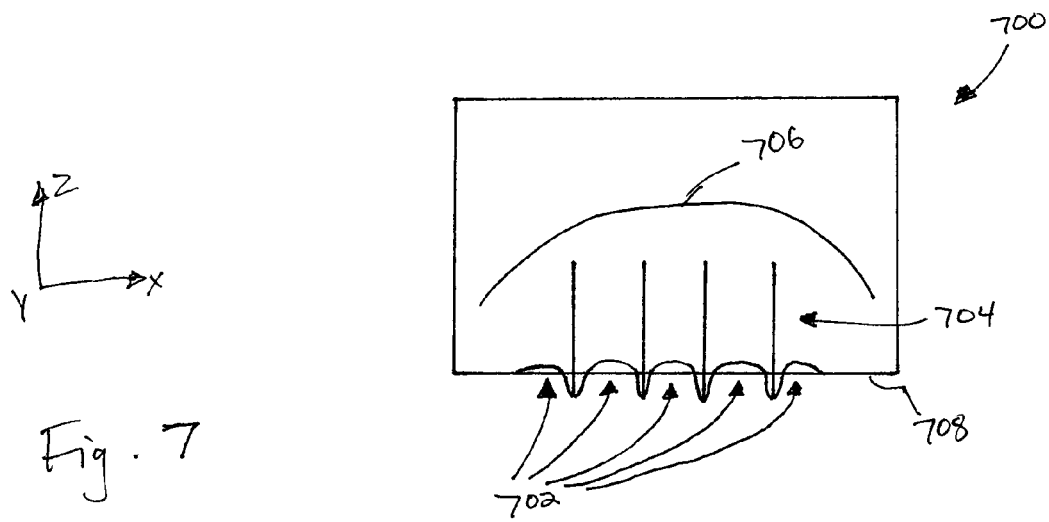
FIG. 7 is a cross-sectional view of a track recording head having a preferentially recessed area surrounding a plurality of styli of the track recording head.

Some embodiments include track recording heads having a preferentially recessed area surrounding one or more styli. For example, FIG. 7 illustrates a cross-section of a track recording head 700 having a preferentially recessed area 702 surrounding a plurality of styli 704. The styli 704 are configured to be actuated by a stylus actuator 706. The recessed area 702 can be formed by activating the stylus actuator 706 during a standard lapping process. In this and other embodiments, the stylus actuator 706 causes the styli 704 and the region surrounding the styli 704 to extend beyond the plane of an air bearing surface 708 of the track recording head 700. The lapping process laps the region surrounding the styli 704 to be flush with the plane of air bearing surface 708, while the styli 704 protrude beyond the plane of air bearing surface 708 due to being made from a different material with a lower lap rate than the material in the region surrounding the styli 704. When the stylus actuator 706 is de-activated, the styli and region surrounding the styli 704 retreat into the track recording head 700, thereby creating the recessed area 702. Alternately or additionally, the recessed area 702 can be formed by applying a preferential lapping process in the region surrounding the styli 704.

In the example of FIG. 7, the formation of the recessed area 702 is configured to avoid incidental contact of the styli 704 with a corresponding rotating magnetic storage medium after tracks have been written to the rotating magnetic storage medium by the styli 704. In particular, the formation of recessed area 702 ensures that styli 704 are retreated away from the rotating magnetic storage medium and at least partially into track recording head 700 when the stylus actuator 706 is not activated. Thus, the track recording head 700 can be used as a standard read/write head with read/write transducer 610 even after the styli 704 have been used to write tracks on the rotating magnetic storage medium without the styli 704 getting in the way. In some embodiments, the recessed area 702 is sufficiently deep to cause the styli 704 to retreat entirely behind the air bearing surface 708 when not actuated.

Styli according to the embodiments described herein can implement a variety of shapes and patterns. For instance, the track recording head 300 of FIG. 3 includes a single stylus 312 forming a ridge along the air bearing surface 306 in the y direction. The track recording head 400 of FIGS. 4A-4B includes multiple styli 412, each forming a ridge, the styli 412 being spaced apart from and aligned parallel to each other. It will be appreciated that styli according to the embodiments herein are not limited to forming a ridge and/or being aligned parallel to each other.

Figure 8:
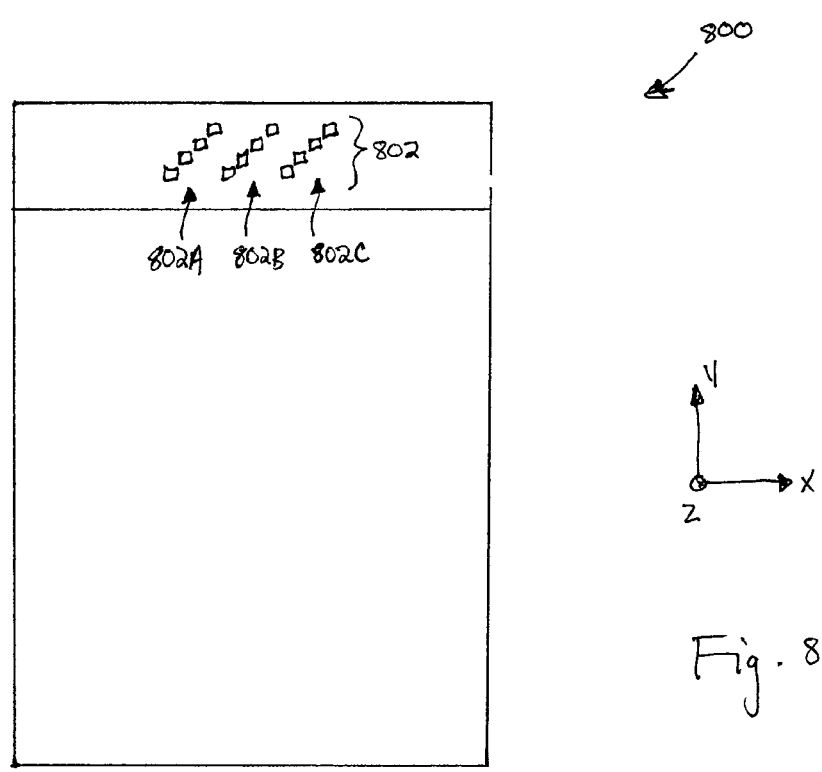
FIG. 8 illustrates a track recording head having a plurality of post-shaped styli.

For instance, FIG. 8 discloses an embodiment of a track recording head 800 having a plurality of styli 802 that are each shaped like a post, rather than forming ridges. The post-like styli 802 are spaced apart from each other a predetermined distance in the x direction that corresponds to a desired track spacing or some multiple thereof.

As further depicted in FIG. 8, the styli 802 include a plurality of groups 802A, 802B, 802C. Within each group 802A, 802B, 802C, the styli 802 are offset from each other in the y direction. The offset determines a bit spacing within each track.

In operation, the track recording head 800 can be used to isolate tracks and bits within each track. More particularly, the track recording head 800 isolates concentric tracks by rotating a corresponding rotating magnetic storage medium, actuating the styli 802 using a stylus actuator (not shown) to apply stress to the rotating magnetic storage medium, and holding a corresponding HGA steady so as to isolate the tracks in concentric circles. This process creates one set of isolated concentric tracks. After each set of concentric tracks are isolated, the stylus actuator is de-activated and the HGA moves the track recording head 800 to a new location on the rotating magnetic storage medium to create another set of isolated concentric tracks.

After track isolation, the individual bits within each isolated concentric track are isolated by actuating the styli 802 and sweeping the track recording head 800 substantially radially across the surface of the rotating magnetic storage medium. Due to rotation of the rotating magnetic storage medium during bit isolation, the isolation regions formed during the sweeping motion may form a spiral pattern, as best seen in and explained with respect to FIG. 11C below.

In some embodiments, the styli 802 include anywhere from 100 to 1000 styli arranged in a staggered pattern and are configured to be actuated by a single stylus actuator or multiple stylus actuators. Alternately or additionally, the styli 802 are arranged in a linear pattern, a skew pattern, or any combination thereof.

Alternately or additionally, the number of styli 802 defines the number of bits per sector together with error correction code when the track recording head is used to write track and bit patterns to a rotating magnetic storage medium. In some examples, the number of bits per sector defined by the number of styli 802 may range from 500-5000 bits per sector.

In some embodiments, the bit pattern frequency is defined by one or more of the skew, horizontal spacing, and/or vertical spacing between styli 802, the speed of a corresponding rotating magnetic medium and/or the speed of a corresponding HGA. In this and other examples, the speed of the HGA where the track recording head 800 is connected is between 5-100 meters per second.

IV. Patterning

It will be appreciated, with the benefit of the present disclosure, that various systems and methods can be employed to write tracks and/or bit patterns to a rotating magnetic storage medium. Further, a variety of patterns can be created to suit various applications. Some example systems, methods and patterns will each be discussed in turn below.

A. Example Systems

Figure 9A:
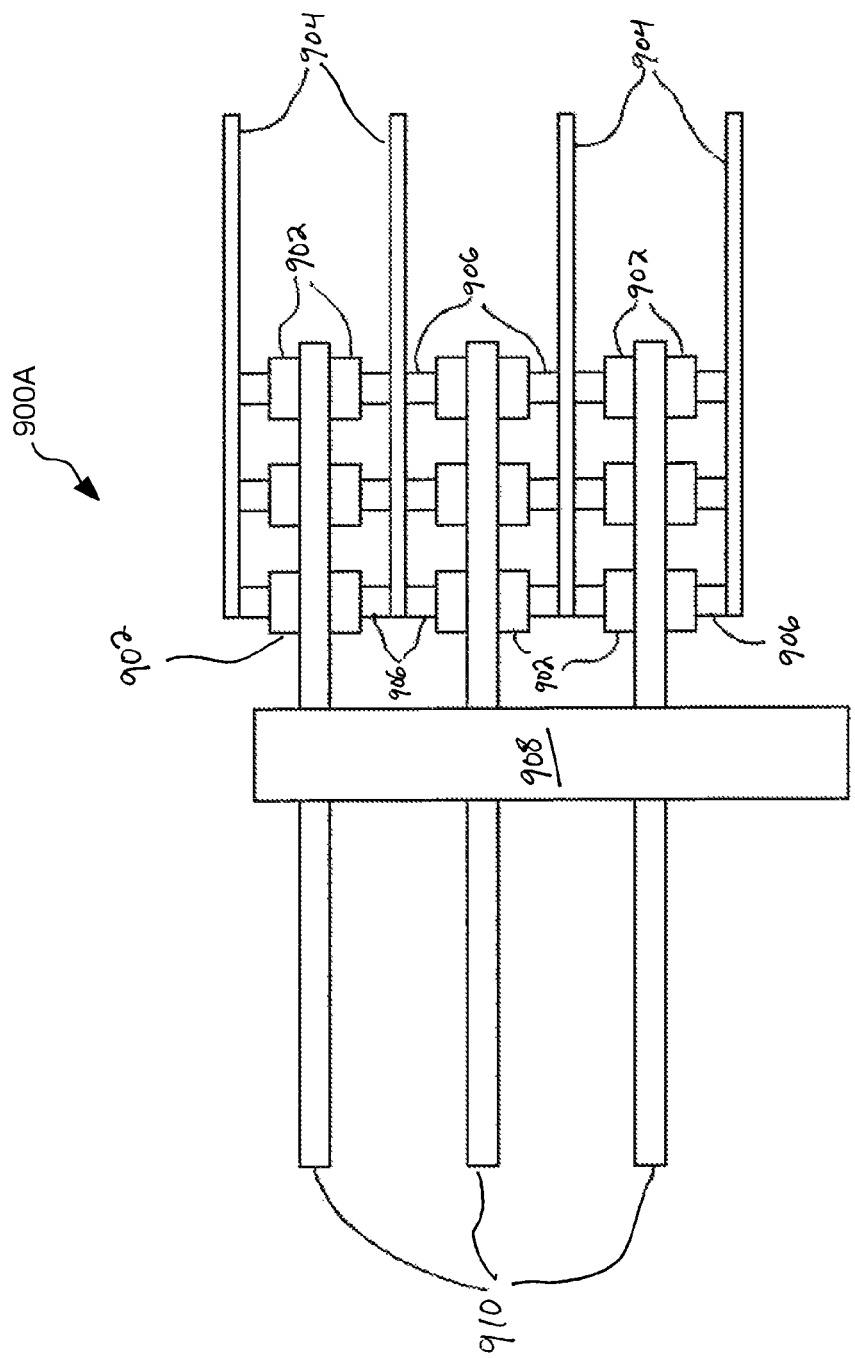
FIG. 9A depicts a system for ex-situ track and/or bit pattern writing using track recording heads according to some embodiments.
Figure 9B:
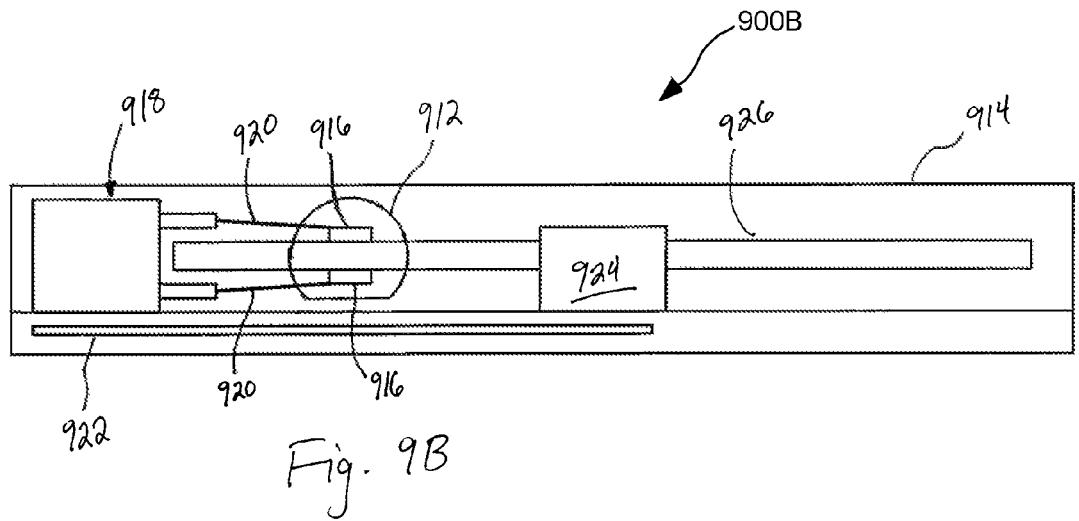
FIGS. 9B-9C depict a system for in-situ track and/or bit pattern writing using track recording heads according to some embodiments.
Figure 9C:
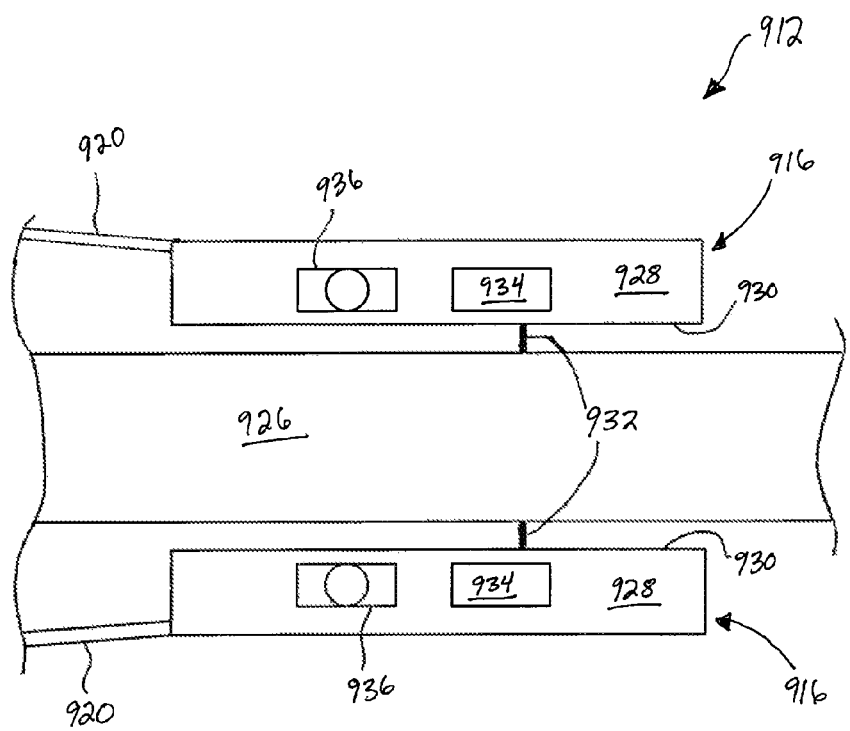

With additional reference to FIGS. 9A-9C, two systems 900A, 900B for writing (e.g., isolating) tracks and/or bit patterns to one or more rotating magnetic storage media are disclosed. The system 900A of FIG. 9A is configured for ex-situ track and/or bit pattern writing, meaning the system 900A is configured to write tracks and/or bit patterns to a rotating magnetic storage medium prior to assembling the rotating magnetic storage medium into a corresponding magnetic storage device, such as the magnetic storage device 200 of FIG. 2A. In contrast, the system 900B of FIGS. 9B-9C is configured for in-situ track and/or bit pattern writing, meaning the system 900B is configured to write tracks and/or bit patterns to a rotating magnetic storage medium after the rotating magnetic storage medium has been assembled into a magnetic storage device. Indeed, the system 900B of FIGS. 9B-9C is a magnetic storage device.

In the embodiment of FIG. 9A, the system 900A includes a plurality of track recording heads 902, each connected to an HGA 904 via a micro actuator assembly 906 for precise and independent control of track placement. The track recording heads 902 may correspond to one or more of the track recording heads 300, 400, 502, 602A, 700 or 800 of FIGS. 3-8, each track recording head 902 having one or more styli and corresponding stylus actuator and optionally a read/write transducer.

The system 900A further includes a spin stand having a spindle 908 to which a plurality of disks 910 are attached for track and/or bit pattern writing by the track recording heads 902. The disks 910 are examples of rotating magnetic storage media according to some embodiments. In some examples, the disks 910 have a servo pattern or the like such that track patterns can be tightly controlled positionally.

In operation, the spindle 908 rotates the disks 910 and the track recording heads 902 activate their one or more styli via corresponding stylus actuators to create isolation regions for isolating individual tracks on the disks 910. The track recording heads 902 can be operated so as to create a concentric track pattern or a spiral track pattern on the disks 910. Alternately or additionally, after writing the track pattern on each disk 910, the track recording heads 902 can be swept radially across the disks 910 for individual bit isolation.

As depicted in FIG. 9A, the system 900A includes a spindle 908 capable of supporting a plurality of disks 910 and the system 900A further includes a plurality of track recording heads 902 on each side of each disk 910 for ex-situ track and/or bit pattern writing. In other embodiments, systems configured for ex-situ track and/or bit pattern writing may include a spindle capable of supporting a single disk and/or may include a single track recording head for each side of each disk. Thus, the ex-situ track and/or bit pattern writing system 900A of FIG. 9A is provided by way of example only and should not be construed to limit the invention.

In the example of FIGS. 9B-9C, the system 900B is a magnetic storage device that may correspond to the magnetic storage device 200 of FIG. 2A, for example. FIG. 9B depicts a cross-sectional view of the system 900B and FIG. 9C depicts a cross-sectional view of a portion 912 of the system 900B.

As depicted in FIG. 9B, the system 900B includes a housing 914 within which is disposed a plurality of track recording heads 916 connected to an actuator assembly 918 via a plurality of HGAs 920. The system 900B further includes a printed circuit board ("PCB") 922, spindle 924, and a disk 926. Although not shown, one or more micro actuator assemblies may be provided between the track recording heads 916 and HGAs 920 for precise and independent control of track placement. The PCB 922 includes, among other things, control circuitry for controlling operation of the actuator assembly 918, spindle 924 and/or micro actuator assemblies. In some examples, the disk 926 has a servo pattern or the like prior to assembly into the system 900B.

FIG. 9C illustrates details regarding the track recording heads 916. Each of track recording heads 916 includes a main body 928 having air bearing surface 930. A stylus 932 is formed on the air bearing surface 930 of each track recording head 916 near a corresponding stylus actuator 934 also formed in the main body 928. The stylus actuator 934 is a heater element in some embodiments and is configured to actuate the stylus 932 towards the disk 926. In the example of FIG. 9C, the stylus 932 of each track recording head 916 is illustrated in activated position in contact with the disk 926. Each track recording head 916 additionally includes a read/write transducer 936.

In operation, the spindle 924 rotates the disk 926 and the track recording heads 916 activate each stylus 932 via stylus actuators 934 such that the styli 932 apply stress to the disk 926 to create isolation regions. The HGAs 920 can be moved in a stepwise manner so as to create a concentric track pattern or the HGAs 920 can be moved in a continuous manner so as to create spiral tracks on the disk 926. The read/write transducers 936 servo off of pre-written servo patterns to control track spacing. Alternately or additionally, after writing the track pattern on the disk 926, the track recording heads 916 can be swept radially across the disk 926 for individual bit isolation, again using pre-written magnetic servo information as a method to precisely control the locations of the isolation regions.

As depicted in FIGS. 9B-9C, the system 900B is a magnetic storage device including a spindle 924 capable of supporting a single disk 926 and further including a single track recording head 916 on each side of the disk 926 for in-situ track and/or bit pattern writing. In other embodiments, systems that are magnetic storage devices configured for in-situ track and/or bit pattern writing may include a spindle capable of supporting a plurality of disks and/or may include a plurality of track recording heads for each side of each disk. Thus, the in-situ track and/or bit pattern writing system 900B of FIGS. 9B-9C is provided by way of example only and should not be construed to limit the invention.

B. Example Method

Figure 10:
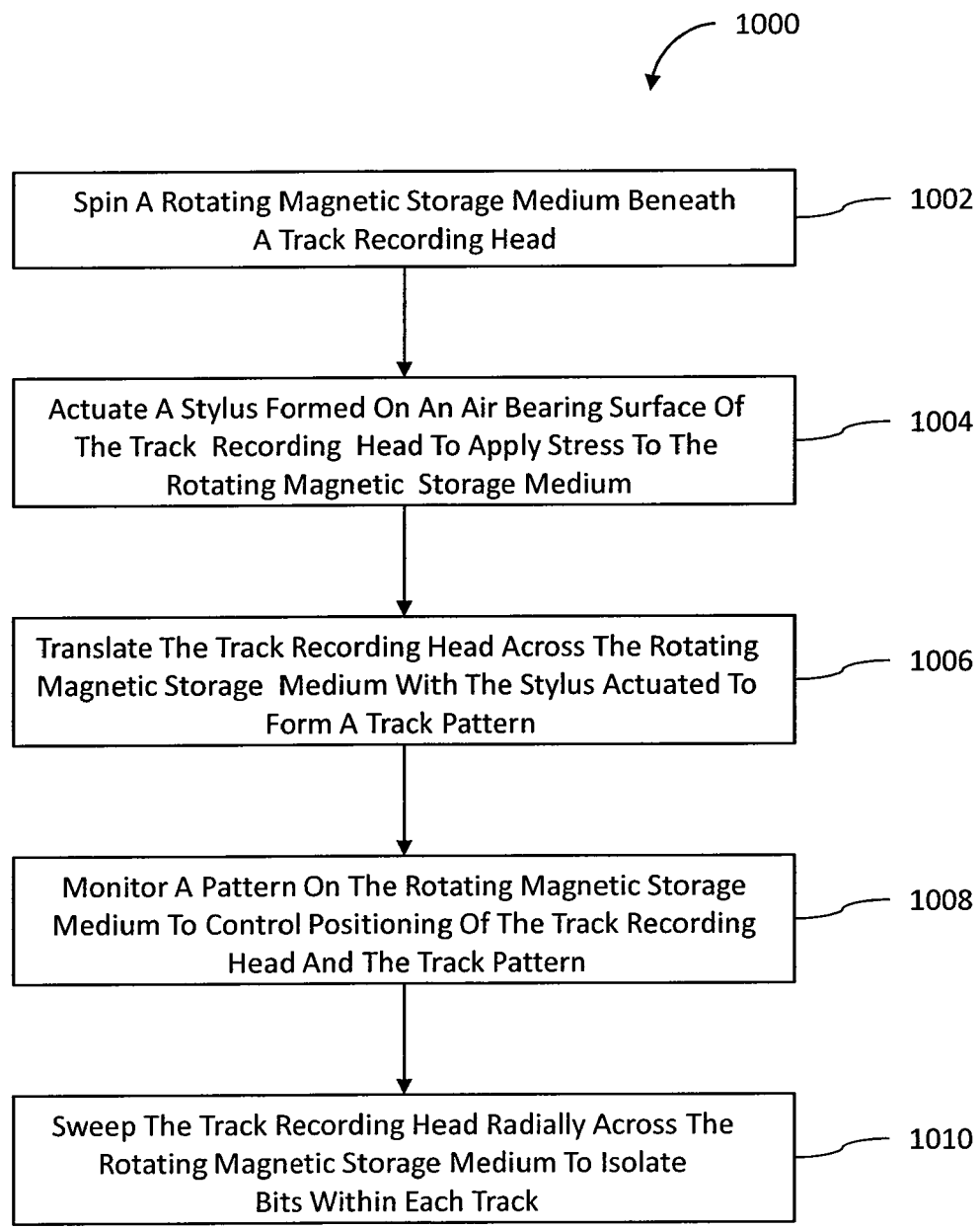
FIG. 10 is a flow chart of an example method for writing tracks and/or bit patterns to one or more rotating magnetic storage media.

With additional reference to FIG. 10, an example method 1000 of writing tracks and/or bit patterns to one or more rotating magnetic storage media such as the disks 910, 926 of FIGS. 9A-9C is disclosed. The method 1000 can be implemented in the systems 900A and 900B of FIGS. 9A-9C and/or in other systems including one or more track recording heads such as those described above with respect to FIGS. 3-9C.

The method begins at 1002 by rotating the rotating magnetic storage medium beneath a track recording head. Alternately or additionally, a magnetic servo pattern is initial written on the corresponding rotating magnetic storage medium, to be used for control during the track isolation process.

At 1004, at least one stylus formed on an air bearing surface of the track recording head is actuated such that the stylus applies stress to a corresponding surface of the rotating magnetic storage medium during its rotation, thereby creating an isolation region between adjacent tracks of the rotating magnetic storage medium.

At 1006, the track recording head is translated across the surface of the rotating magnetic storage medium with the stylus actuated so as to form a track pattern including the resulting isolation regions. Optionally, step 1006 can be pulsed within or between tracks and/or around individual tracks to minimize track recording head wear.

At 1008, and simultaneous with step 1006, a servo pattern on the rotating magnetic storage medium is monitored to control positioning of the stylus and the track pattern that is formed.

Optionally, the method 1000 further includes at 1010 sweeping the track recording head substantially radially across the rotating magnetic storage medium with the stylus actuated so as to isolate bits within each track.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

When the method 1000 is implemented in an ex-situ track and/or bit pattern writing system such as the system 900A of FIG. 9A, the method 1000 may begin by loading one or more disks 910 onto spindle 908. The disks 910 may have a servo pattern or other pattern previously written on them from a disk certifier process. The spindle 908 then spins the disks 910 at step 1002, followed by the track recording heads 902 turning on stylus actuators such as heater elements to actuate corresponding styli to apply stress to the disks 910 at step 1004 to create one or more isolation regions.

In some embodiments, the track recording heads 902 create initial isolation regions at step 1004 and then de-activate the styli before writing the isolation regions across the entirety of each disk 910. A read/write transducer in each track recording head 902 is then scanned over the initial isolation regions to determine appropriate calibration requirements, both for the styli in each track recording head 902 and the magnetic characteristics of each track recording head 902 and disk 910 (such as write width, read width, overwrite, signal to noise ratio, etc.). For instance, the width of each isolation region may depend on the magnitude of the stress applied by a corresponding stylus. Further, the magnitude of the stress applied by each stylus can be controlled by actuating each stylus to a greater or lesser degree via corresponding stylus actuators. Thus, after scanning the initial isolation regions, each track recording head 902 can be calibrated on an individual basis to ensure consistency in isolation region width and matching to the corresponding magnetic head and media parametric performance.

After calibrating the track recording heads 902, step 1004 is repeated to actuate the styli of track recording heads 902 and the track recording heads 902 are translated across the rotating magnetic storage medium at step 1006 to form the track pattern. At step 1006, the track recording heads 902 may be translated across the disks 910 in a stepwise manner to form a concentric track pattern on each disk 910 or the track recording heads 902 may be translated in a continuous manner to form a spiral track pattern on each disk 910.

Simultaneous with step 1006, a read/write transducer in each of track recording heads 902 monitors the servo or other pattern on the disks 910 to control positioning of the track recording heads 902 and the resulting track pattern. Alternately or additionally, each read/write transducer monitors the tracks that have been written by the stylus/styli of the track recording head 902 to control positioning. Positioning adjustments, if necessary, can be made to the track recording heads 902 using micro actuator assemblies 906.

When the method 1000 is implemented in an in-situ track and/or bit pattern writing system such as the system 900B of FIGS. 9B-9C, the method 1000 may begin by placing the system 900B in a stable rack with a power supply and a temperature-controlled environment. The environment is controlled to a predetermined temperature to assist in the track writing process since the track writing process and magnetic stress erasure is easier to accomplish at relatively higher temperatures including the predetermined temperature. In some embodiments, the predetermined temperature is between 30-60° C.

Track writing firmware is then loaded onto the system 900B to control the track writing process. Execution of the track writing firmware in some embodiments causes the system 900B to run a self-characterization routine on each of track recording heads 916 to identify one or more of stylus actuator 934 settings, written track width, signal to noise ratio, bits-per-inch ("BPI") capability, spacing sensitivity, or the like. Alternately or additionally, the self-characterization routine identifies stylus 932 characteristics by actuating 1004 the stylus 932 in an unused area of the disk 926 to create an initial isolation region and scanning the initial isolation region to identify one or more of off-set between the read/write transducer 936 and the stylus 932, isolation region width as a function of stylus actuator 934 setting, or the like.

The information collected during the self-characterization routine is used to determine a track pitch for each zone of the disk 926. After determining the track pitch, at step 1006 the track recording heads 916 are translated across the first zone of the disk 926 with the stylus 932 of each track recording head 916 actuated to form a track pattern. Simultaneously, and at step 1008, the track recording heads 916 servo off of a reader signal obtained by monitoring a servo pattern or the track amplitude of areas in which isolation regions have already been formed to control the track pattern. The track pattern may be a concentric track pattern formed by stepwise translation of the HGAs 920, a spiral track pattern formed by continuous translation of the HGAs 920, or some other track pattern. This process is repeated by zone until every zone of each disk 926 in the system 900B has been track written.

By writing the tracks on the disk 916 based on the characteristics of the track recording heads 902, the disk 916 can be formatted to support its maximum capacity. In particular, systems 900B that include narrow track recording heads 902 can format disks 926 to have more tracks than the disks 926 of systems 900B that include wide track recording heads 902. In addition, in normal operation after the tracks have been written, the system 900B can servo off of the individual data tracks using average track amplitude, for instance, rather than the split wedge methods used previously for improved format efficiency. Further, because the tracks are written in the same system 900B in which the disk 926 is used, the disk 926 and spindle 924 axes of rotation are coincidental for improved drive access performance. Alternately or additionally, for systems 900B that include faulty or defective styli 932, the disk 926 can still be formatted to a lower track density using conventional technologies.

In some embodiments, the styli 932 are not used after the track pattern and/or bit pattern writing process is complete. Alternately or additionally, the styli 932 can be subsequently used to burnish asperities identified on the disk 926 to prevent damage to the read/write transducers 936.

Optionally, final drive code can be downloaded onto the system 900B after the track pattern has been formed.

In executing the method 1000 in a system such as systems 900A, 900B, a laser, LED, IR source or other direct heating method, or indirect heating method such as cabinet temperature, is optionally used to increase the temperature of the rotating magnetic storage media prior to the isolation region creation process to help ensure consistency of the process.

C. Example Patterns

Figure 11A:
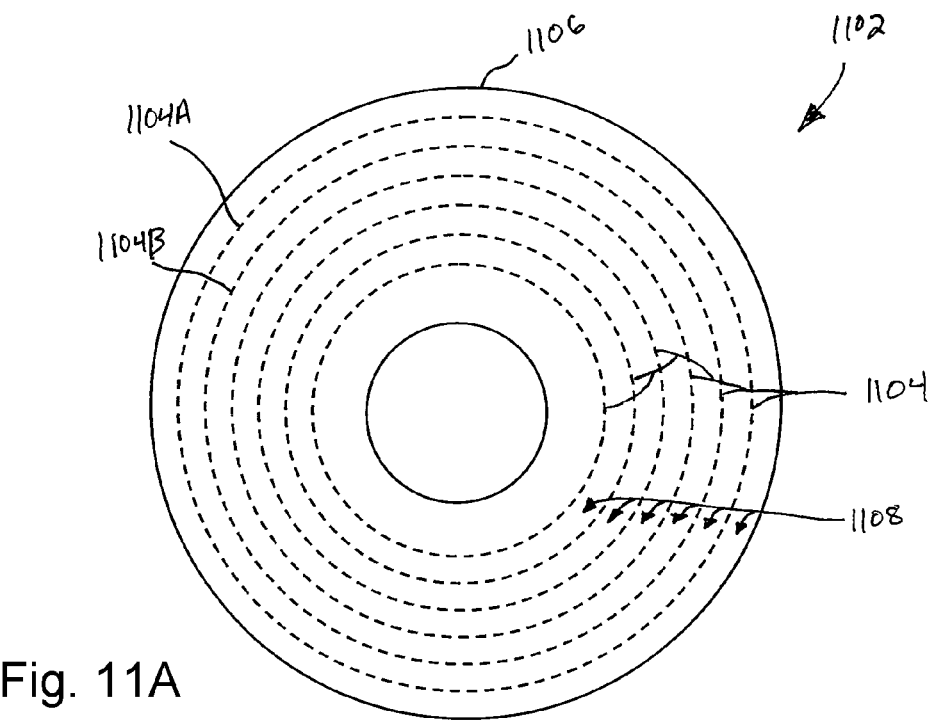
FIGS. 11A-11C illustrate various track and/or bit patterns that can be formed using track recording heads according to some embodiments.
Figure 11B:
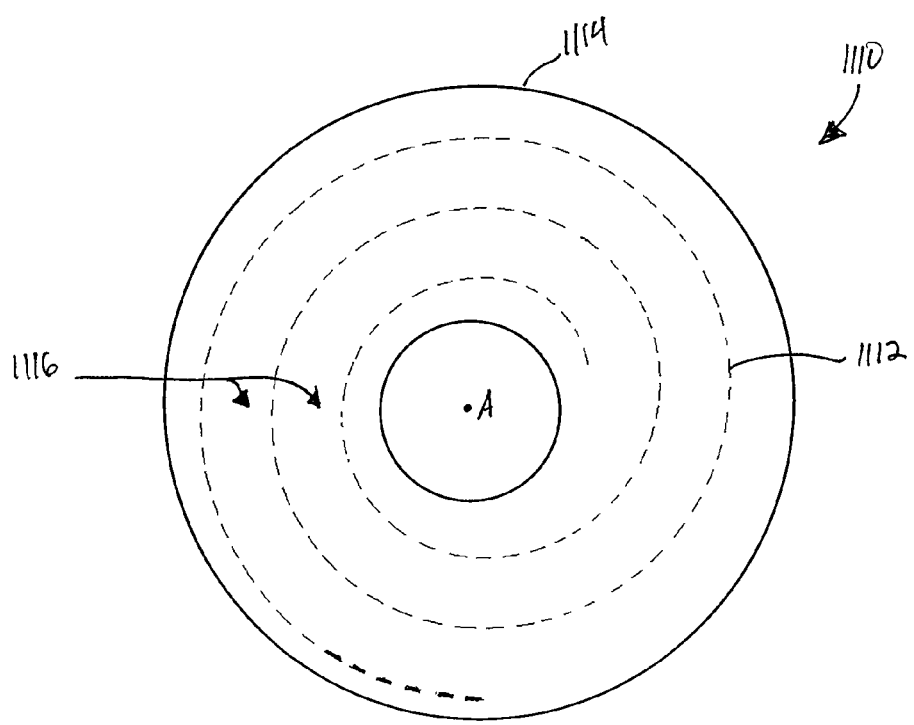
Figure 11C:
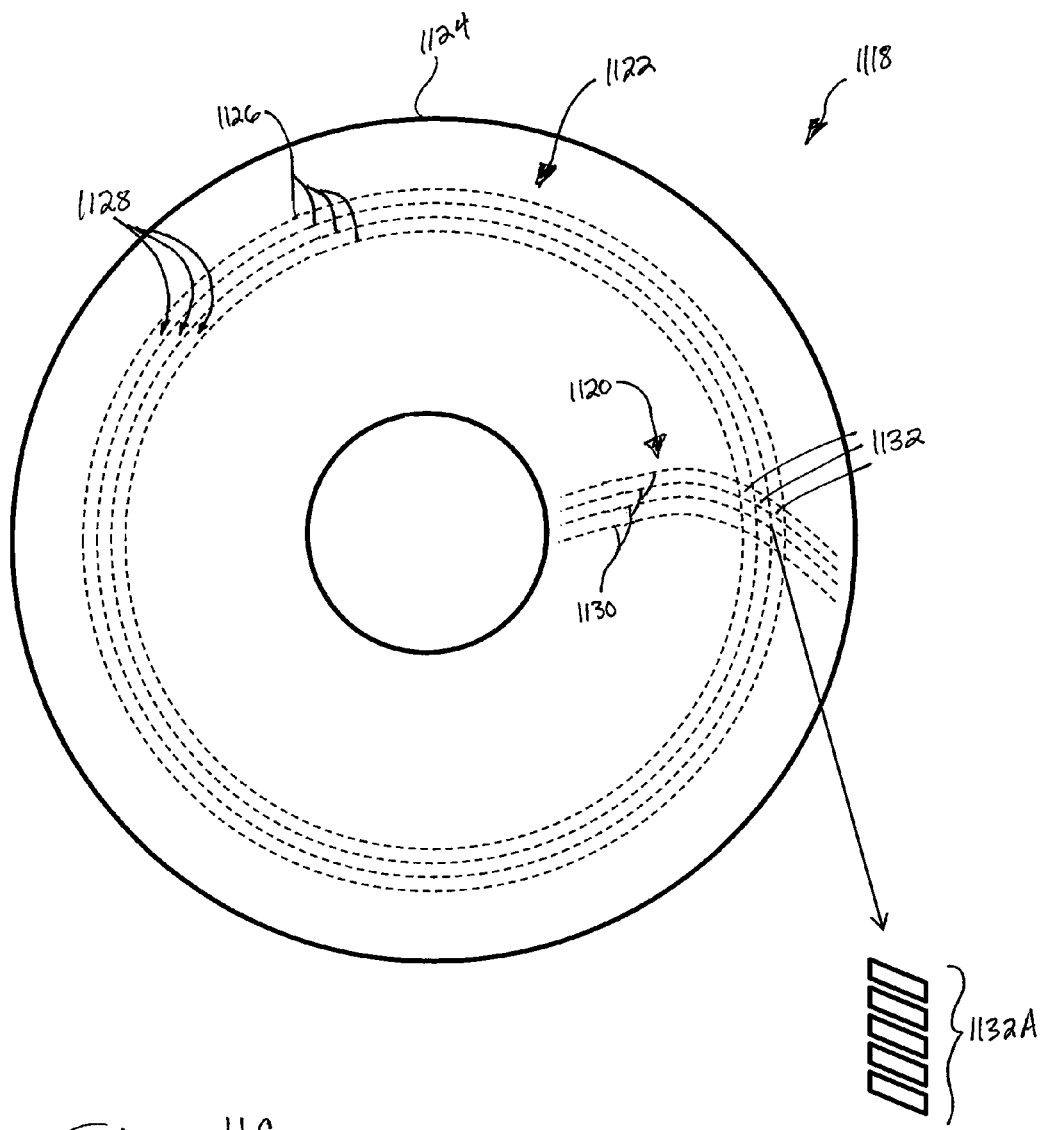

With additional reference to FIGS. 11A-11C, various track patterns and/or bit patterns are disclosed that can be formed using one or more of the track recording heads described herein. It will be appreciated that the track patterns illustrated in FIGS. 11A-11C are not drawn to scale.

FIG. 11A illustrates an example of a concentric track pattern 1102 including a plurality of concentric isolation regions 1104 formed on a disk 1106 by a track recording head such as track recording heads 300, 400, 502, 602, 700, 800, 902, 916 of FIGS. 3-9C. For ease of discussion, the concentric track pattern 1102 will be discussed in the context of FIG. 3. To create the concentric track pattern 1102, the disk 1106 is rotated with the stylus 312 actuated by stylus actuator 316 to contact and apply stress to the disk 1106 to form a first circular isolation region 1104 centered about the axis of rotation of the disk 1106. The stylus 312 is then deactivated and the HGA 304 is moved to position the track recording head 300 for the next isolation region. In particular, the track recording head 300 is positioned such that the stylus 312 can be activated and apply stress to the disk 1106 while the disk 1106 rotates to create the adjacent circular isolation region 1104B. This process is repeated until all of the circular isolation regions 1104 have been formed to isolate individual tracks 1108 on the disk 1106. Accurate positioning of the track recording head 300 and stylus 312 is optionally possible by using previously written magnetic tracks for servo control.

The process of holding the HGA 304 steady while creating one circular isolation region 1104 and then de-activating the stylus 312 before moving the HGA 304 to an adjacent position where the stylus 312 is actuated and the HGA 304 is held steady for writing the adjacent circular isolation region 1104 is a stepwise process. Thus, the references in the description above to moving the HGAs and/or track recording heads in a stepwise manner refers to moving the HGAs and/or track recording heads according to the stepwise process just described.

FIG. 11B illustrates an example of a spiral track pattern 1110 including a single isolation region 1112 formed on a disk 1114 by a track recording head such as track recording heads 300, 400, 502, 602, 700, 800, 902, 916 of FIGS. 3-9C. For ease of discussion, the spiral track pattern 1110 will be discussed in the context of FIG. 3. To create the spiral track pattern 1110, the disk 1114 is rotated with the stylus 312 actuated by stylus actuator 316 to contact and apply stress to the disk 1114 to create isolation region 1112. As the disk 1114 is rotating and the stylus 312 is stressing the disk 1114, the HGA 304 continuously increases the distance of the stylus 312 from the axis of rotation A of the disk 1114 such that the isolation region 1112 forms a spiral shape. The isolation region 1112 thereby defines a spiral shaped track 1116 in the regions between adjacent portions of the isolation region 1112.

Alternately, a track recording head including a plurality of styli that are spaced apart from each other by a multiple of the desired track width can be employed to write a nested spiral track pattern (not shown). For instance, track recording head 400 of FIGS. 4A-4B could be employed to write a nested spiral track pattern if the styli 412 are uniformly spaced apart from each other by some multiple of the desired track width. In this example, a disk is rotated with the styli 412 actuated to contact and apply stress to the disk. As the disk is rotating and the styli 412 are stressing the disk, the HGA 404 continuously increases the distance of the track recording head 400 from the axis of rotation of the disk. This process continues until the spiral track pattern created by each inner stylus 412 reaches the spiral track pattern created by the adjacent outer stylus 412. The styli 412 can then be de-activated while the HGA 404 repositions the track recording head 400 over an adjacent area of the disk that has not yet been track written, whereupon the styli 412 are actuated again to create another set of nested spiral track patterns. The track recording head 400 can be repositioned as many times as necessary to write the nested spiral track pattern across the writeable surface of the disk.

Optionally, the concentric track pattern 1102 of FIG. 11A, spiral track pattern 1110 of FIG. 11B or other track pattern can be combined with a bit pattern. For example, FIG. 11C illustrates an example of a combined pattern 1118 including a spiral bit pattern 1120 written over a concentric track pattern 1122. The combined pattern 1118 is formed on a disk 1124 by a track recording head having one or more styli shaped as posts, rather than ridges, such as the track recording head 800 of FIG. 8. The combined pattern 1118 will be discussed in the context of FIG. 8.

As illustrated in FIG. 11C, the concentric track pattern 1122 includes a plurality of concentric isolation regions 1126 defining a plurality of concentric tracks 1128 therebetween. For simplicity, the concentric track pattern 1122 is only illustrated on part of the disk 1124. In practice, however, after the track writing process is complete, the concentric track pattern 1122 covers a much more substantial portion of the disk 1124.

The spiral bit pattern 1120 includes a plurality of spiraling isolation regions 1130 that spiral sharply out from the inner diameter of the disk 1124 to its outer diameter (or from the outer diameter of the disk 1124 to its inner diameter). The spiraling isolation regions 1130 define a plurality of isolated bit regions 1132 within each track 1128. A close up of some adjacent isolated bit regions 1132A within one of the tracks 1128 is depicted in the lower right-hand portion of FIG. 11C. For simplicity, the spiral bit pattern 1120 is only illustrated on part of the disk 1124. In practice, however, after the bit pattern writing process is complete, the spiral bit pattern 1120 covers a much more substantial portion of the disk 1124.

To create the combined pattern 1118 of FIG. 11C, the disk 1124 is rotated with the styli 802 of track recording head 800 actuated to contact and apply stress to the disk 1124 to simultaneously create a plurality of concentric isolation regions 1126. The styli 802 can then be de-activated while the track recording head 800 is repositioned over an adjacent area of the disk 1124 that has not yet been track written, whereupon the styli 802 are actuated to apply stress and create concentric isolation regions 1126 in the adjacent area of the disk 1124.

This stepwise translation of the track recording head 800 across the surface of the disk 1124 continues until the concentric track pattern 1122 is completed on the disk 1124.

After completing the concentric track pattern 1122, the spiral bit pattern 1120 is formed. To create the spiral bit pattern 1120, the disk 1124 continues to rotate at the same or a different speed than the speed during the track writing process. The track recording head 800 is positioned at the inner diameter of the disk 1124 and then swept radially outward towards the outer diameter of the disk 1124 with the styli 802 actuated to simultaneously create a plurality of spiraling isolation regions 1130. Alternately, the track recording head 800 is positioned at the outer diameter of the disk 1124 and then swept radially inward towards the inner diameter of the disk 1124. Because the disk 1124 is rotating while the track recording head 800 is swept across the disk 1124, the isolation regions 1130 spiral away from the inner diameter of the disk 1124.

After each sweep, the styli 802 are de-activated while the track recording head 800 returns to the inner (or outer) diameter of the disk for the next sweep. When an area adjacent to the area that was just bit-written rotates under the track recording head 800, the track recording head 800 is swept radially outward (or inward) again with the styli 802 actuated. The process of de-activating the styli 802, returning the track recoding head 800 to the inner (or outer diameter) and sweeping the track recording head 800 with the styli 802 actuated repeats until the spiral bit pattern 1120 is completed on the disk 1124.

In some embodiments, and as best seen in the close up of adjacent isolated bit regions 1132A of FIG. 11C, the spiral nature of the spiraling isolation regions 1130 creates isolated bit regions 1132A within each track 1128 that are generally aligned in shape and position to the orientation of a corresponding read/write transducer element that may be included in the track recording head 800. Optionally, the speed of the HGA to which the track recording head is mounted 800 can be varied to optimize the shape and/or alignment of the isolated bit regions 1132 for better signal to noise ratio during readback (e.g., lower track-edge noise).

Optionally, the rotational speed of the rotating magnetic medium can be tightly controlled during bit pattern writing to ensure each of the spiral isolation regions 1130 are consistent around the disk 1124. In this and other examples, the rotational speed of the disk 1124 may be controlled at a speed in the range of 500-5000 rotations per minute and using closed loop control available from magnetic bits previously written on the disk 1124.

In some embodiments, extra space is included between each spiraling isolation region 1120 or between each adjacent set of spiraling isolation regions 1120, wherein a set of spiraling isolation regions 1120 includes every spiraling isolation region 1120 created with one sweep of the track recording head 800. Alternately or additionally, extra space can be included between each sector of disk 1124. The extra space between sectors is between 0.5-5 μm in some embodiments. Optionally, format information is written magnetically to the extra space.

In some examples, a magnetic pattern can be written to the disk 1124 prior to bit patterning. The magnetic pattern can be used for closed loop control of the bit pattern formation. Alternately or additionally, several additional bits can be included in each sector of the disk 1124 to allow for missing or damaged styli 802.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A track recording head for creating discrete tracks in a rotating magnetic storage medium, the track recording head comprising:
    a main body configured to be attached to a head gimbal assembly, the main body having an air bearing surface configured to face a corresponding surface of a rotating magnetic medium;
    at least one stylus formed on the air bearing surface of the main body and configured to be actuated towards the surface of the rotating magnetic storage medium to contact and apply stress to the surface of the rotating magnetic storage medium to create isolation regions of non-directionally magnetizable material; and a stylus actuator formed in the main body and configured to actuate the at least one stylus.

2. The track recording head of claim 1, wherein the at least one stylus is ridge shaped and is between 0.01 to 0.1 micro meters wide and between 0.1 to 5 micro meters long.

3. The track recording head of claim 1, wherein the application of stress to the surface of the rotating magnetic storage medium by the at least one stylus is configured to change a magnetic layer of the rotating magnetic storage medium from a directionally magnetizable crystal lattice to a non-directionally magnetizable crystal lattice in an area of influence of the at least one stylus.

4. The track recording head of claim 1, wherein the at least one stylus comprises at least one of diamond, carbon, diamond-like-carbon, carbon nano-tubes, silicon carbide, silicon nitride, alumina or titanium carbide.

5. The track recording head of claim 1, wherein the stylus actuator comprises a heater element.

6. The track recording head of claim 1, wherein the at least one stylus includes a plurality of styli spaced apart from each other by a predetermined distance, wherein the predetermined distance is substantially equal to a desired track width or a multiple of the desired track width.

7. The track recording head of claim 1, further comprising a read/write transducer element formed in the main body, the read/write transducer element configured for monitoring positioning of the track recording head with respect to the rotating magnetic storage medium for positioning control of the track recording head.

8. The track recording head of claim 7, further comprising a transducer actuator for actuating the read/write transducer, wherein the transducer actuator and stylus actuator share a ground.

9. The track recording head of claim 1, further comprising a preferentially recessed area surrounding the at least one stylus such that the at least one stylus does not protrude beyond the plane of the air bearing surface towards the surface of the rotating magnetic storage medium unless the at least one stylus is actuated.

10. The track recording head of claim 9, wherein the preferentially recessed area is formed by actuating the at least one stylus and surrounding area to extend beyond a plane of the air bearing surface and lapping the at least one stylus and surrounding area while the at least one stylus and surrounding area are actuated.

11. The track recording head of claim 1, wherein the track recording head is sectioned out of a wafer including a plurality of track recording head areas, the at least one stylus being deposited in each of the track recording head areas at the wafer level and then exposed after sectioning of the wafer into a plurality of track recording heads and lapping of the air bearing surface of each track recording head.

12. A method of creating discrete and magnetically uncoupled tracks in a rotating magnetic storage medium, the method comprising:

rotating the rotating magnetic storage medium beneath a track recording head;

actuating at least one stylus formed on an air bearing surface of the track recording head such that the at least one stylus applies stress to a surface of the rotating magnetic storage medium, the applied stress being sufficient to create an isolation region of non-directionally magnetizable material between adjacent tracks in the rotating magnetic storage medium;

translating the track recording head across the surface of the rotating magnetic storage medium with the at least one stylus actuated during at least part of the translation to form a track pattern including one or more isolation regions on the rotating magnetic storage medium;

monitoring a servo pattern written on the rotating magnetic storage medium to control positioning of the at least one stylus and to thereby control the track pattern that is formed.

13. The method of claim 12, wherein the track pattern formed is a concentric track pattern, a spiral track pattern, or a nested spiral track pattern.

14. The method of claim 12, further comprising, repeatedly sweeping the track recording head substantially radially across the rotating magnetic storage medium with the at least one stylus actuated during each sweep to form a bit pattern including isolated bit regions within each track.

15. The method of claim 14, wherein the bit pattern is a spiral bit pattern.

16. The method of claim 12, wherein the track recording head is translated across the surface of the rotating magnetic storage medium in a stepwise manner that includes one or more track writing steps alternated with one or more track recording head repositioning steps, with the at least one stylus being actuated during the track writing steps and the at least one stylus being de-activated during the track recording head repositioning steps.

17. The method of claim 12, wherein a lubricant is included on the surface of the rotating magnetic storage medium, the method further comprising:

stripping the lubricant from the surface of the rotating magnetic storage medium after the track pattern is completed; and adding new lubricant to the surface of the rotating magnetic storage medium.

18. The method of claim 12, further comprising, re-conditioning the at least one stylus by lapping the air bearing surface, wherein the at least one stylus comprises a material that laps at a slower rate than the material of the track recording head surrounding the at least one stylus.

19. The method of claim 12, further comprising, pulsing actuation of the at least one stylus between tracks or around individual tracks.

20. The method of claim 12, further comprising, prior to actuating the at least one stylus to create an isolation region between adjacent tracks in the rotating magnetic storage medium:

magnetically writing the servo pattern to the rotating magnetic storage medium;

actuating the at least one stylus;

creating an initial isolation region;

de-activating the at least one stylus;

scanning a read/write transducer included in the track recording head across the initial isolation region; and calibrating the track recording head based on results of the scan across the initial isolation region.

21. The method of claim 20, wherein the track recording head includes a stylus actuator for actuating the at least one stylus and wherein calibrating the track recording head includes determining isolation region width as a function of stylus actuator setting.

22. The method of claim 12, further comprising, controlling temperature of the rotating magnetic storage medium to ensure consistency in forming the track pattern on the rotating magnetic storage medium, wherein the temperature of the rotating magnetic storage medium is controlled using a laser, a light emitting diode, an infrared light source or a temperature-controlled environment.

23. The method of claim 12, wherein the method is implemented in a magnetic storage device including the rotating magnetic storage medium and the track recording head, the track recording head including a stylus actuator and a read/write transducer, the method further comprising, prior to actuating the at least one stylus to create an isolation region between adjacent tracks in the rotating magnetic storage medium:
- loading track writing firmware onto the magnetic storage device;
- executing the track writing firmware to run a self-characterization routine on the track recording head to identify at least one of:
  - settings of the stylus actuator;
  - written track width;
  - signal to noise ratio;
  - bits-per-inch capability;
  - spacing sensitivity;
  - off-set between the read/write transducer and the at least one stylus; or
  - isolation region width as a function of stylus actuator setting;
- determining a track pitch for each zone of the rotating magnetic storage medium using information collected during the self-characterization routine; and
- writing a track pattern to each zone of the rotating magnetic storage medium based on the corresponding determined track pitch.

24. The method of claim 23, further comprising loading final drive code onto the magnetic storage device after the track pattern has been completed on the rotating magnetic storage medium, and wherein the servo pattern is eliminated from the rotating magnetic storage medium and a final drive servo is based on the tracks formed by creating isolation regions therebetween.

25. The method of claim 23, wherein the magnetic storage device includes a plurality of rotating magnetic storage media and a plurality of track recording heads, at least one track recording head for each surface of each rotating magnetic storage medium, and wherein the track pitch on each surface of each rotating magnetic storage medium is determined by independently optimizing track recording density for each track recording head and rotating magnetic storage medium surface combination.

26. The method of claim 12, further comprising:
- measuring an off-track force on the track recording head due to skew; and
- determining and setting stress applied through the at least one stylus based on the measured off-track force.

* * * * *